United States Patent
Blom et al.

(10) Patent No.: US 10,863,442 B2
(45) Date of Patent: Dec. 8, 2020

(54) SYSTEM, METHOD, AND COMPUTER PROGRAM FOR ADAPTING POWER USAGE OF A MOBILE UNIT

(71) Applicant: KONINKLIJKE PHILIPS N.V., Eindhoven (NL)

(72) Inventors: Antonius Hermanus Maria Blom, Escharen (NL); Wilhelmus Andreas Marinus Arnoldus Maria Van Den Dungen, Boxtel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/768,028

(22) PCT Filed: Oct. 10, 2016

(86) PCT No.: PCT/EP2016/074119
§ 371 (c)(1),
(2) Date: Apr. 13, 2018

(87) PCT Pub. No.: WO2017/063964
PCT Pub. Date: Apr. 20, 2017

(65) Prior Publication Data
US 2018/0310250 A1 Oct. 25, 2018

(30) Foreign Application Priority Data
Oct. 13, 2015 (EP) .................... 15189586

(51) Int. Cl.
*H04W 52/02* (2009.01)
*H04W 52/38* (2009.01)
*H04W 64/00* (2009.01)

(52) U.S. Cl.
CPC ... *H04W 52/0251* (2013.01); *H04W 52/0254* (2013.01); *H04W 52/0258* (2013.01);
(Continued)

(58) Field of Classification Search
CPC ...... H04W 16/00–16/32; H04W 52/00–52/60; H04W 64/00; Y02D 70/00; Y02D 70/26
See application file for complete search history.

(56) References Cited

U.S. PATENT DOCUMENTS

| 5,987,328 A | 11/1999 | Ephremides et al. |
| 6,119,009 A | 9/2000 | Baranger et al. |

(Continued)

FOREIGN PATENT DOCUMENTS

| CN | 103596193 A | 2/2014 |
| EP | 1274268 A2 | 1/2003 |

(Continued)

OTHER PUBLICATIONS

Akkaya et al: "Positioning of Base Stations in Wireless Sensor Networks"; Topics in Ad Hoc and Sensor Networks, IEEE Communications Magazine, Apr. 2007, pp. 96-102.

(Continued)

*Primary Examiner* — Raymond S Dean

(57) ABSTRACT

The present invention relates to a system (100), a method (200) and a computer program for adapting power usage of a mobile unit (110) that is configured to communicate data to a base unit (120). In wearable/portable modules, the power needed by an ISM radio link between the wearable/portable mobile unit (110) and the (quasi-)stationary base unit (120) is determined primarily by the attenuation of the transmitted wave between transmitter and receiver. By monitoring the power setting needed for the transmitter to maintain the link, that information can be used to optimize the position of the base unit (120) for achieving lowest power consumption in the battery operated mobile unit (110).

20 Claims, 2 Drawing Sheets

(52) U.S. Cl.
CPC ........... *H04W 52/38* (2013.01); *H04W 64/00* (2013.01); *Y02D 70/00* (2018.01); *Y02D 70/26* (2018.01)

(56) References Cited

U.S. PATENT DOCUMENTS

| | | | | |
|---|---|---|---|---|
| 9,992,690 | B2* | 6/2018 | Butchko | H04L 43/50 |
| 2006/0030350 | A1* | 2/2006 | Mitchell | H04W 52/146 |
| | | | | 455/522 |
| 2006/0199552 | A1* | 9/2006 | Blech | H04W 52/245 |
| | | | | 455/127.1 |
| 2007/0002813 | A1* | 1/2007 | Tenny | G01S 5/0242 |
| | | | | 370/338 |
| 2008/0070565 | A1 | 3/2008 | Maeda | |
| 2008/0235351 | A1* | 9/2008 | Banga | G06Q 30/02 |
| | | | | 709/218 |
| 2011/0092237 | A1 | 4/2011 | Kato | |
| 2013/0082878 | A1* | 4/2013 | Jarvis | G01S 5/02 |
| | | | | 342/458 |
| 2014/0031703 | A1* | 1/2014 | Rayner | A61B 5/02055 |
| | | | | 600/484 |
| 2014/0171145 | A1 | 6/2014 | Che et al. | |
| 2015/0029868 | A1 | 1/2015 | Mahasenan et al. | |
| 2015/0257108 | A1* | 9/2015 | Hara | H04W 48/16 |
| | | | | 370/311 |
| 2015/0327118 | A1* | 11/2015 | Yoon | H04W 28/0289 |
| | | | | 370/328 |

FOREIGN PATENT DOCUMENTS

| | | | | |
|---|---|---|---|---|
| EP | 2928245 | A1 | 10/2015 | |
| WO | 2008056850 | A2 | 5/2008 | |
| WO | WO-2008069603 | A1 * | 6/2008 | ........... H04W 52/04 |
| WO | 2014205151 | A1 | 12/2014 | |

OTHER PUBLICATIONS

Deora et al: "Harnessing Non-Uniform Transmit Power Leveles for Improved Sequence Based Localization"; Department of Electrical Engineering, University of Southern California; Published in IEEE Internalnational Conference on Distributed Computing in Sensor Systems (DCOSS) 2014, 8 Page Document.

Liang et al: "Aggregate Node Placement for Maximizing Network Lifetime in Sensor Networks"; Wireless Communications and Mobile Computing, 2010, 17 Page Document.

Zadeh: "Base Station Positioning and Relocation in Wireless Sensor Networks"; University of Alberta Thesis, Department of Electrical and Computer Engineering, 2010, 63 Page Document.

* cited by examiner

SYSTEM, METHOD, AND COMPUTER PROGRAM FOR ADAPTING POWER USAGE OF A MOBILE UNIT

CROSS-REFERENCE TO PRIOR APPLICATIONS

This application is the U.S. National Phase application under 35 U.S.C. § 371 of International Application No. PCT/EP2016/074119, filed on Oct. 10, 2016, which claims the benefit of European Patent Application No. 15189586.9, filed on Oct. 13, 2015. These applications are hereby incorporated by reference in their entirety herein.

FIELD OF THE INVENTION

The invention relates to system for adapting power usage of a mobile unit that is configured to communicate data to a base unit, to an analysis unit that is configured to be employed in the system, to a method for adapting power usage of a mobile unit that is configured to communicate data to a base unit, and to a computer program for adapting power usage of a mobile unit that is configured to communicate data to a base unit.

BACKGROUND OF THE INVENTION

A mobile unit such as, e.g., a wearable piece of electronics with communication means needs a certain battery capacity to operate over the specified period of time for a fully charged battery. In case of very poor transmission conditions over an extended period of time, the battery capacity might not be able to last for the specified time of operation. Such a condition might lead to serious problems for health care applications, in which an operating (wearable) mobile unit is essential to ensure a safe condition for a person under surveillance. This is for instance a possible scenario for a mobile unit needed to find an Alzheimer's disease patient who started to wander, while his worn mobile unit is almost out of energy. A 'battery low' condition can be monitored in a straightforward manner, but it is desirable to monitor excessive power usage in advance and provide information for optimizing the location of the stationary part, i.e., the base unit, for lowest average transmission power usage to optimize system performance in terms of available searching time when actually needed in a stressful situation.

The article "*Positioning of Base Stations in Wireless Sensor Networks*" by K. Akkaya et al, IEEE Communications Magazine, April 2007, pp. 96 to 102, addresses positioning of the base station (BS) as a means for increasing the dependability of Wireless sensor networks (WSN). Dynamic schemes are introduced that reposition the BS during the network operation. It is shown that dynamic BS positioning can be very effective in optimizing the network functional and non-functional performance objectives and in coping with dynamic changes in the environment and available network resources.

A wireless communication system according to US 2011/0092237 A1 includes a mobile base station apparatus connecting to a terminal apparatus and being movable, and a management server performing entralized control of the mobile base station apparatus. The mobile base station apparatus measures its position and notifies the management server of position information indicating the position. The management server transmits control information according to the position information notified from the mobile base station apparatus, to the mobile base station apparatus. The mobile base station apparatus operates using the control information received from the management server.

SUMMARY OF THE INVENTION

It is an object of the present invention to provide an improved system, method, and computer program for adapting power usage of a mobile unit that is configured to communicate data to a base unit, as well as an improved analysis unit that is configured to be employed in the system.

In an aspect of the invention, there is provided a system for adapting power usage of a mobile unit that is configured to communicate data to a base unit, the system comprising: said mobile unit, said base unit, and an analysis unit; wherein at least one of said mobile unit and said base unit is configured to provide transmission power information to said analysis unit, wherein said transmission power information corresponds to a transmission power needed by said at least one of said mobile unit and said base unit as a function of time; wherein said analysis unit is configured to receive spatial information, wherein said spatial information corresponds to a relative location of said mobile unit with respect to said base unit as a function of time; wherein said analysis unit is configured to provide a recommendation on a location of said base unit, wherein said recommendation is based on said transmission power information and on said spatial information.

It shall be understood that the spatial information may correspond to an absolute position of the mobile unit over time that may subsequently be compared to the base unit's absolute position. It shall further be understood that the spatial information may correspond to a distance between the mobile unit and the base unit over time. It shall further be understood that the spatial information may correspond to a weighted distance between the mobile unit and the base unit over time. Weighting may be performed, e.g., on the basis of how well transmission is possible between the mobile unit and the base unit. For instance, mobile unit and base unit may be geometrically close to each other in that they are "only" separated by a 1 m thick concrete wall. However, since the concrete affects transmission between the units, the spatial information may reflect the difference to a situation where mobile unit and base unit are 1 m apart in the same room.

Persons who require surveillance on their position within a certain area (such as, e.g., Alzheimer's disease patients) can be provided with a mobile unit (e.g., a small wearable device) which is (preferably continuously) in contact with a base unit, e.g., by means of a radio link. Because the mobile unit typically requires powering by a battery, power usage is a critical figure. One of the dominant energy consuming components of the mobile unit while in the domestic environment is the mobile unit's (radio) transmitter unit. The transmission power level would typically be set such that the system is able to maintain communication throughout the monitoring time at lowest possible power level. In that respect, the power usage is already optimized. Unfortunately, the major factor determining the needed transmission power for maintaining communication is the attenuation of the transmitted power by the medium between the mobile unit's transmit unit and the base unit's receiver unit. That medium will change when the person under surveillance is moving within the allowed area due to the presence of walls, furniture, equipment, ceiling, floor, etc. and thus will affect the needed power setting for the mobile unit's transmit unit. In principle, this variation in needed transmission power is unpredictable. In actual cases however, the patient's location within the monitored area will show, up to a certain extent, repeatable patterns over a day time. In case of significant periods of time requiring a high transmission power which becomes dominant in the power consumption, the situation can be improved significantly by placing the base unit at a position requiring much less transmission power for that dominant place and only low or modest increase of power for the other periods. Clearly, an optimal location of the base unit depending on the subject's moving pattern may be found.

The transmission power information may be provided by the base station or by the mobile station. It is assumed that the transmission power needed to transfer data from the base station to the mobile station is low when the transmission power needed to transfer data from the mobile station to the base station is low as well and vice versa. In an embodiment, monitoring the transmission power is performed on the base unit side. In an example, the mobile unit sends back information about the gain setting of its receiver to interpret the transmitter signal correctly. In an example, the transmitter power setting is mirrored automatically.

In an example, mobile unit and base unit communicate via a single point to point radio link. The base unit is typically quasi-stationary. The other end of the link is a mobile unit, such as, e.g., a wearable device. The needed transmission power to maintain the radio link and perform a reliable measurement of the distance between base unit and mobile unit is optimized (preferably minimized) to safe battery power in the mobile unit. Input data to perform the power optimization may be one or more of the following: the transmission power needed to maintain a connection between mobile unit and base unit and to perform a reliable distance measurement between base unit and mobile unit over time; and a caregiver's knowledge about the mobile unit's location over time. Together with the information of transmission power as a function of time, the caregiver is able to correlate a given location in the home environment with a corresponding power usage level. This connection between power level and position in home environment may be made in a software application on the caregiver's smart phone. The analysis unit (e.g., a (software) tool) may calculate and propose a more suitable base unit position based on the input data in order to lower transmission power usage. Still another option could be to simply extract the most occurring position of the mobile unit in the home environment (such as, e.g., a preferred room, a position in that room) and report that to the caregiver who is able to move the base unit closer to that location. In addition, a time frame of the most occurring position can be evaluated in order to have a check on the validity of that preferred position.

In an embodiment, said spatial information corresponds to a distance between said mobile unit and said base unit.

In an embodiment, said spatial information corresponds to a weighted distance between said mobile unit and said base unit.

In an embodiment, said mobile unit comprises a transmitter unit; said base unit comprises a receiver unit; and said transmitter unit is configured to transmit said data to said receiver unit over a radio link. It is however noted that other means of (wireless) communication are conceivable as well. The specific type of communication protocols does not block the implementation of the present approach of optimizing the communication link in terms of power usage. In an example, the hardware implementation provides information about the transmitter and receiver settings to maintain communication. In an example employing an Industrial, Scientific and Medical Band (ISM) link, a distance measurement technique is provided. In case of using a different wireless communication technique an accurate distance measurement technique is preferred, but not essential. Namely, an indication of a repeating pattern of high power usage during certain times might be sufficient to give a positioning advice. It is further noted that the data processing for optimizing the base unit's location will typically not be time critical. It therefore is to be expected that the described method of optimizing the base unit's location can be achieved over any type of wireless communication link. It is desirable, but not essential that there is a distance measurement in place providing the information about the distance between base unit and mobile unit. Alternatively, one may consider tracking the base unit and/or the mobile unit's location and power use.

In an embodiment, said radio link comprises a point-to-point radio link. By focusing on point-to-point radio links, the embodiment is particularly suited for monitoring subjects (such as, e.g., Alzheimer's disease patients) wearing a mobile unit by means of a base station within their home. Namely, for this type of application, there will be only one mobile unit and only one base station communicating with each other. Additional overhead (e.g., referring to an identification of a respective mobile unit ID or the like) can therefore be avoided. Employing the present invention with multiple mobile devices or base stations necessitates more tracking and identification. It is further noted that a subject carrying a mobile unit might be in a plurality of different places throughout the day, so that said recommendation on said location of said base unit might be harder to identify.

In an embodiment, said analysis unit is configured to provide said recommendation on the base unit's location by recommending a location corresponding to said relative location during a time period wherein said transmission power needed by said mobile unit or by said base unit is on average high compared to other time periods. In an embodiment, the mobile unit's transmission power is monitored throughout e.g. a day. Typically, the transmission power will vary throughout the day depending inter alia on the mobile unit's location with respect to the base unit. The relative location might involve a larger (or smaller) distance or more (or less) media (such as, e.g., walls) between mobile unit and base unit. Consequently, when recommending to move the base unit to a location where the mobile unit's or the base unit's transmission power is, on average, high, the base station will typically be moved to a location which involves a smaller distance and/or which involves the base station being shielded from the mobile unit by less media. Consequently, the mobile unit's and/or the base unit's transmission power may be reduced.

In an embodiment, said mobile unit further comprises an activity monitoring unit that is configured to provide activity data as a function of time for a subject wearing said mobile unit; wherein said analysis unit is configured to provide said recommendation on the base unit's location further based on said activity data. In an example, the base station is not moved regularly during a day for achieving the lowest transmission power level. In such an example, the base station remains at a position where the needed transmission energy is lowest on average during a whole day period. In this embodiment, activity information may be combined with the day time and distance data to extract information about the actual position of the subject: low activity at this time of the day at that distance may be related to the bed room, similar activity at another specific distance may be related to a comfort chair in the living room, high activity at other specific distances and times may be related to the kitchen etc. Since time periods of high activity suggest that the subject is moving about, it might be less preferable for these time periods to move the base station close to the mobile station's location (namely, because the subject will have soon moved away in any case). Time periods of low activity on the other hand might suggest that a subject will stay at the given location for a longer time (e.g., because the subject is in bed, because the subject is sitting on the couch, etc.). In such an embodiment, detecting the subject's not moving away from the base unit would imply that no communication is needed. In that embodiment, the base unit may be placed close to the most moving areas of the home (i.e., areas where the activity is high) because there the transmission is the highest.

In an embodiment, said mobile unit further comprises a power supply unit; wherein said analysis unit is configured to provide said recommendation on the base unit's location further based on a power level of said power supply unit. In the embodiment, the recommendation may involve proposing to move the base unit to a location where transmission power has been low right away. Accordingly, transmission power may be saved and battery lifetime may be increased without requiring a battery recharge right away.

In an embodiment, said analysis unit is configured to provide said recommendation on the base unit's location by evaluating average values for corresponding time periods on different days. Typically, a subject will exhibit regular behavior involving, e.g., staying in bed until 7 a.m., taking a shower and having breakfast between 7 a.m. and 8.30 a.m., reading the newspaper in the living room thereafter etc. By evaluating average values for corresponding time periods on different days (e.g., for the time period between 7 a.m. to 8.30 a.m. on Mondays, Tuesdays, and Wednesdays), a common behavior in terms of the mobile unit's location may be extracted. By providing the recommendation on the base unit's location in view of this common behavior, the recommendation is more reliable as opposed to using only the data of e.g. one given day. It is noted that apart from day to day routines, there are routines which might have a weekly frequency, for instance for physical therapy or medical check-up at home. If this weekly deviating activity goes with high transmission power, it might be better to advice to do this activity at a different location in the home if possible instead of moving the base station.

In an embodiment, said analysis unit comprises an input unit that is configured to receive said spatial information. Said input unit may correspond to a data interface, such as, e.g., a USB port, by which said spatial information may be transferred to the analysis unit.

In an embodiment, said analysis unit comprises a user interface unit that is configured to receive said spatial information. The user interface may comprise any means for user to provide data to the analysis unit, including, but not limited to, a keyboard, a touchpad, a speech recognition interface, an interactive display, etc. By employing a user interface unit, spatial information may be provided in a straightforward manner, e.g., by the caregiver of an Alzheimer's disease patient. That is, said spatial information may be provided on-the-fly as the mobile unit is carried around. For instance, when a subject wearing the mobile unit is moving from the bedroom to the kitchen, this information may be provided to the analysis unit via the user interface, which may additionally add a time stamp. Additionally and/or alternatively, the mobile unit's locations throughout the day may be entered via the user interface at specific times (e.g., at the end of the day) so that, if desired, this information may be correlated with the transmission power needed by the mobile unit as a function of time.

In an embodiment, said system further comprises a second mobile unit separate from said mobile unit, wherein said second mobile unit comprises said analysis unit. Specifically, whereas the mobile unit may be configured to be worn by a subject (e.g., a patient with Alzheimer's disease), the second mobile unit may be e.g. a caregiver's mobile phone comprising an application software for providing the recommendation on the base unit's location. Specifically, the recommendation may be provided on the second mobile unit so that the caregiver may move the base unit to a more preferable location right away. Accordingly, when implementing the embodiment, the emphasis may be on providing an analysis unit on the second mobile unit, e.g., in the form of a software application. For the example referring to a caregiver taking care of an Alzheimer's disease patient, this may mean that only a software upgrade of the caregiver's smartphone may be necessary, where the mobile unit worn by the patient at least must be able to provide information on needed transmission power as a function of time.

In an embodiment, said mobile unit comprises an attachment unit that is configured to attach said mobile unit to a subject's wrist. Attaching the mobile unit to the subject's wrist avoids the risk of the subject carrying the mobile unit in his/her pocket and possibly forgetting the mobile unit in the pocket or on a table. It is however noted that attaching the mobile unit to other parts of the subject's body, such as, e.g., to the subject's chest, is expected to have a small effect on measuring the distance between subject and base unit.

In an embodiment, said base unit is quasi-stationary. By providing the base station quasi-stationary, a user is able to move the base station around and choose a more preferable location implying a lower average transmission power needed by the mobile unit.

In an embodiment, said analysis unit is configured to provide said recommendation on the base unit's location by recommending a location corresponding to a location of said mobile unit that occurs most frequently during a selected time period. A selected time period may correspond to one or several day, to one or several weeks, to one or several months, etc. Placing the base unit in a location near to where the mobile unit is located most often will typically result in the mobile unit requiring less overall transmission power, because then, most of the time, the mobile unit is located at a spot where it is close to the base unit implying a lower transmission power.

In an embodiment, said spatial information received by said analysis unit corresponds to locations within a pre-defined space. Specifically, a patient suffering from Alzheimer's disease may spend a significant amount of time in his/her apartment or in a special-care home. An appropriate location of the base unit in the patient's apartment or in the special-care home is therefore desired. Limiting the spatial information to such a pre-defined space (e.g. the premises of the special-care home) allows discarding those time periods, during which the patient has been wandering off the facility.

In a further aspect of the invention, there is provided an analysis unit that is configured to be employed in the system, said analysis unit comprising: a transmission power information providing unit that is configured to receive transmission power information, wherein said transmission power information corresponds to a transmission power needed by at least one of said mobile unit and said base unit as a function of time; and a spatial information providing unit that is configured to receive spatial information, wherein said spatial information corresponds to a relative location of said mobile unit with respect to said base unit as a function of time; wherein said analysis unit is configured to provide a recommendation on a location of said base unit, wherein said recommendation is based on said transmission power information and on said spatial information.

In an embodiment, said transmission power information providing unit comprises a transmission power information input unit. In an embodiment, said spatial information providing unit comprises a spatial information input unit. In an embodiment, said spatial information providing unit comprises a spatial information user interface unit.

In a further aspect of the invention, there is provided a method for adapting power usage of a mobile unit that is configured to communicate data to a base unit, the method comprising the steps of: receiving transmission power information, wherein said transmission power information corresponds to a transmission power needed by at least one of said mobile unit and said base unit as a function of time; receiving spatial information, wherein said spatial information corresponds to a relative location of said mobile unit with respect to said base unit as a function of time; and providing a recommendation on a location of said base unit, wherein said recommendation is based on said transmission power information and on said spatial information.

In a further aspect of the invention, there is provided a computer program for adapting power usage of a mobile unit that is configured to communicate data to a base unit, the computer program comprising program code means for causing the system for adapting power usage of a mobile unit to carry out the steps of the method for adapting power usage of a mobile unit, when the computer program is run on a computer controlling the system for adapting power usage of a mobile unit.

It shall be understood that the system for adapting power usage of a mobile unit of claim 1, the analysis unit of claim 13, the method for adapting power usage of a mobile unit of claim 14 and the computer program for adapting power usage of a mobile unit of claim 15 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
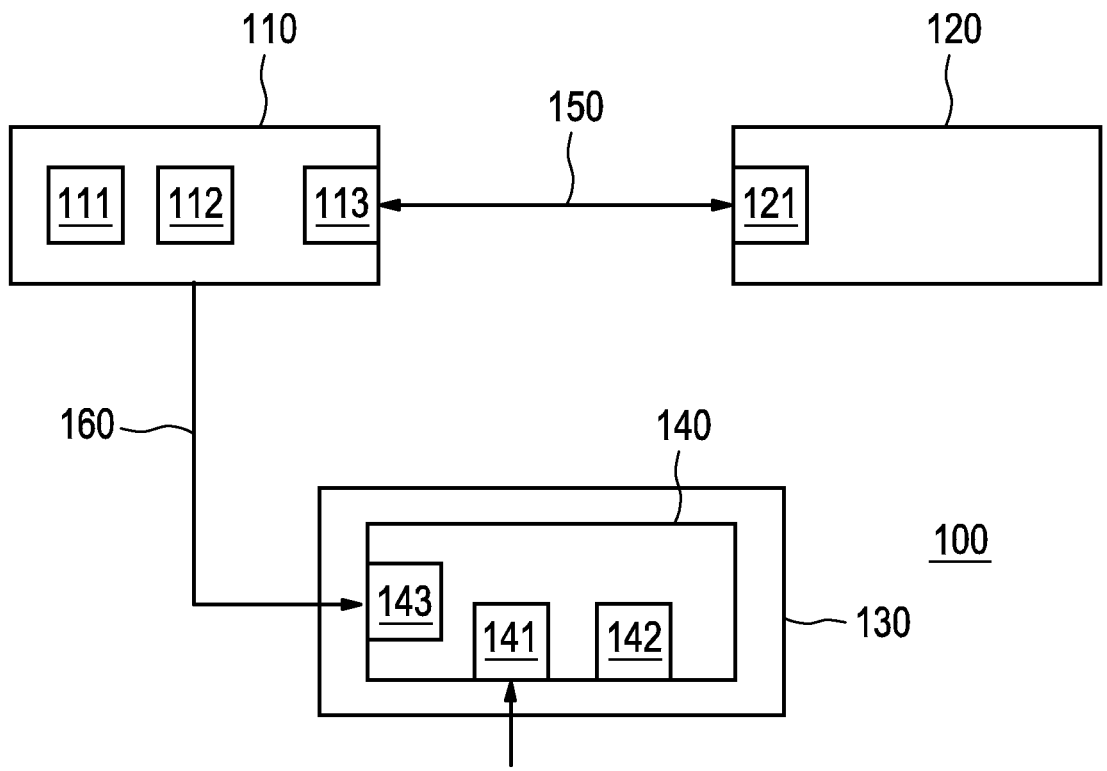
FIG. 1 shows schematically and exemplarily an embodiment of a system for adapting power usage of a mobile unit.

FIG. 1 shows schematically and exemplarily an embodiment of a system 100 for adapting power usage of mobile unit 110 that is configured to communicate data to base unit 120. System 100 comprises mobile unit 110, base unit 120, and analysis unit 140. Mobile unit 110 is configured to provide transmission power information to analysis unit 140. The transmission power information corresponds to a transmission power needed by mobile unit 110 as a function of time. Analysis unit 140 is configured to receive spatial information, which may be, e.g., location information. The spatial information corresponds to a relative location of mobile unit 110 with respect to base unit 120 as a function of time. Analysis unit 140 is configured to provide a recommendation on a location of base unit 120. The recommendation is based on the transmission power information and on the spatial information.

Mobile unit 110 may be a wearable device that is worn by an Alzheimer's patient, who is more or less under surveillance of a caregiver. Radio link 150 may continuously check the presence of mobile unit 110 within the home safe zone, which may have been established e.g. at installation. Maintaining radio link 150 between mobile unit 110's transmitter unit 113 and base unit 120's receiver unit 121 is desirable. Doing this with a small amount of energy is also desirable in order to prevent battery 111 in mobile unit 110 from draining too soon.

Transmission power information may be provided to analysis unit 140 by means of an optional data connection 160 between mobile unit 110 and analysis unit 140. To that extent, analysis unit 140 may be provided with an optional transmission power input unit 143. In the event that analysis unit 140 is comprised within second mobile unit 130, optional data connection 160 may be provided between mobile unit 110 and second mobile unit 130. Information about transmission power can be gathered at both sides of the radio link 150, so in another embodiment, the data connection 160 could also be realized from the base station 120 to the transmission power input 143 of analysis unit 140.

Spatial information may be provided to analysis unit 140 by means of an optional input unit 141 that is configured to receive spatial information (indicated in FIG. 1 by an incoming arrow). Additionally and/or alternatively, analysis unit 140 may comprise user interface unit 142 and spatial information may be provided to analysis unit 140 by means of user interface unit 142.

Figure 2:
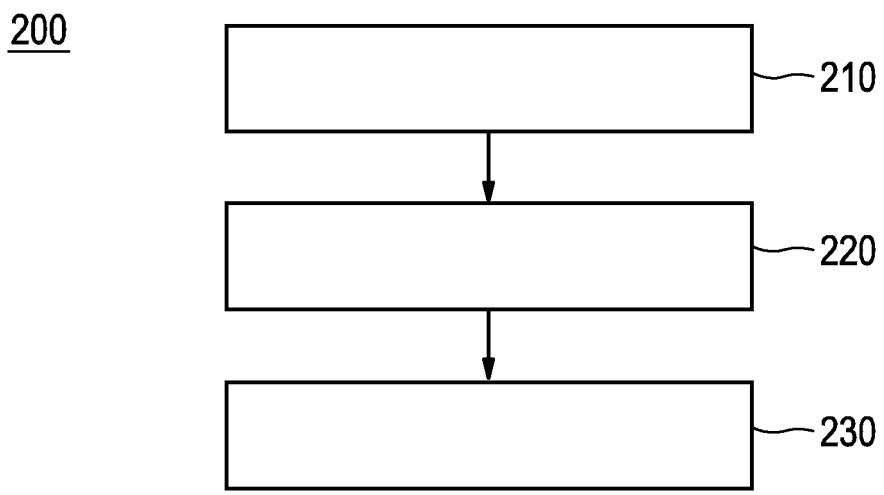
FIG. 2 shows schematically and exemplarily an embodiment of a method for adapting power usage of a mobile unit.

FIG. 2 shows schematically and exemplarily an embodiment of a method 200 for adapting power usage of mobile unit 110 that is configured to communicate data to base unit 120. In a step 210, method 200 comprises the step of receiving transmission power information, wherein said transmission power information corresponds to a transmission power needed by mobile unit 110 as a function of time In a step 220, method 200 comprises the step of receiving spatial information, wherein said spatial information corresponds to a relative location of mobile unit 110 with respect to base unit 120 as a function of time. In a step 230, method 200 comprises the step of providing a recommendation on a location of base unit 120, wherein said recommendation is based on said transmission power information and on said spatial information.

In an example, system 100 employs an industrial, scientific and medical (ISM) radio link 150 between mobile unit 110 and base unit 120 to measure the distance between mobile unit 110 and base unit 120. In an embodiment, system 100 may combine the obtained distance information with time stamps, the used gain-power setting of mobile unit 110's transmitter unit 113 at that time and (if available) accelerometer data from mobile unit 110. Accelerometer data may be obtained by means of optional activity monitoring unit 112. Analysis unit 140 may provide a recommendation concerning how to improve the position of the base unit 120.

In order to be able to indicate an improvement of base unit 120's location with respect to the average position of mobile unit 110, it is desirable to gather respective information. Available information sources, which may or may not be used to help optimizing base unit 120's location, are: the transmission power required to maintain communication between base unit 120 and mobile unit 110; the distance between base station 120 and mobile unit 110; data from an activity monitoring unit 112 (such as, e.g., an accelerometer); power supply (e.g., a battery) 111's charge drainage; and time.

By evaluating the variation of the transmission power, distance data and accelerometer data as a function of time for several full days, a common behavior may be derived in terms of activity and position of the involved person within his/hers domestic environment.

Figure 3:
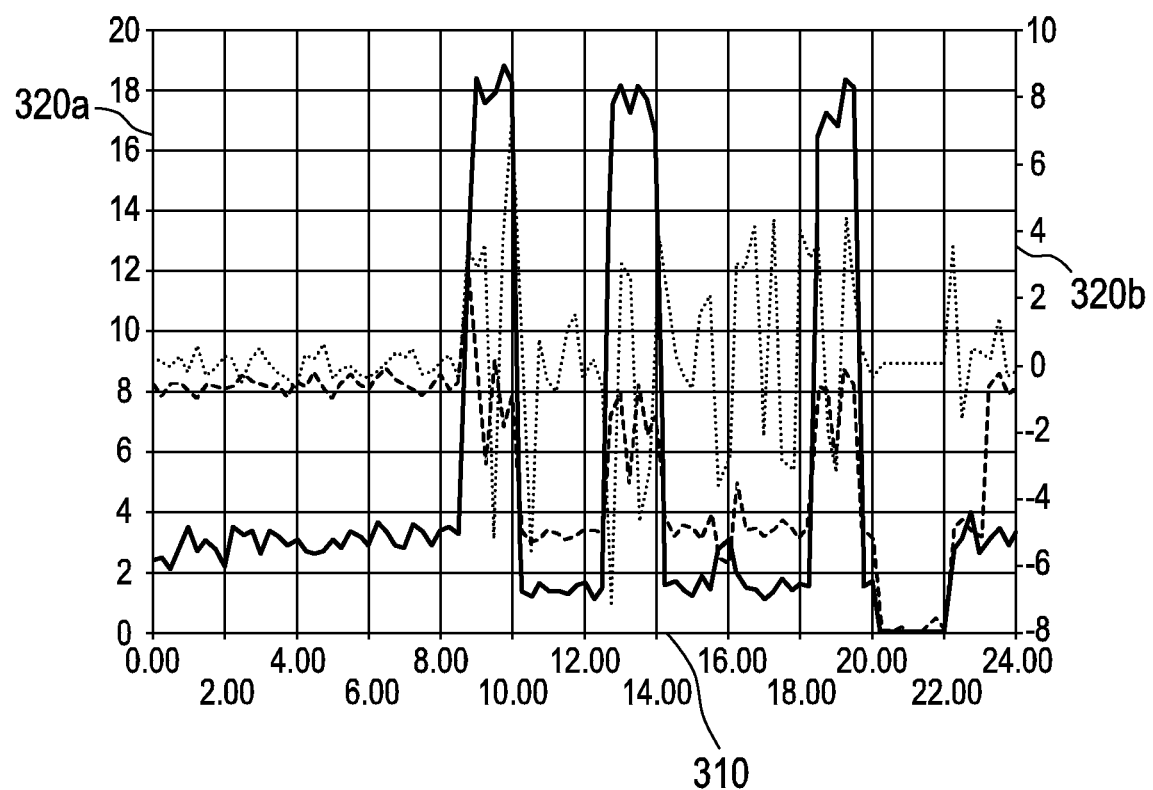
FIG. 3 shows schematically and exemplarily simulated data for a subject's common behavior during an average day.

FIG. 3 shows a graph 300 of simulated data. Graph 300 illustrates an average behavior of a subject over a full day, where the average may be built, e.g., from data collected during seven days. Specifically, graph 300 illustrates average transmission power level (solid line), distance between base unit 120 and mobile unit 110 (dashed line) and accelerometer data (dotted line) over a full day. According to graph 300, transmission power ranges between 0 dBm and 20 dBm (cf. axis 320a), whereas the distance between mobile unit and base unit varies between 0 m and 20 m (cf. axis 320a), whereas acceleration varies between −8 g and 10 g (cf. axis 320b). "dB" indicates a logarithmic ratio of two similar unit numbers. "dBm" stands for decibel mW, where 0 dBm corresponds to a power of 1 mW into a 50Ω load, 20 dBm=$10^{20/10}$·1 mW=100 mW.

Distance measurement shows good reproducibility (i.e., the variation of the measured distance is not large) during the night, involving low transmission power. Night rest situation is supported by low accelerometer levels. In the embodiment, the distance between base unit and mobile unit is measured by means of a time of flight technique, measuring the time it takes for a transmitted wave to travel to the mobile unit and from that back again to the base unit. Knowing the location of the base unit is not essential to determine the distance between base unit and mobile unit. The embodiment is concerned with detecting a less preferred position of the base unit in view of power use. Therefore, knowing the base unit's absolute position is not needed.

In the early morning, around noon and early evening the needed transmission power is very high, while the distance measurement result shows large variations.

A short distance is normally seen during the morning and the largest part of the afternoon, indicating that base unit 120 is in the living room, which is backed-up by the indicated low transmission power level. Indeed, the present example involves a base unit located in the living room.

Between 20:00 and 22:00 hours, the acceleration is near zero as well as the distance and transmission power. This effect may correspond to a daily routine of placing mobile unit 110 on base unit 120 for charging the battery.

Against the shown set of data, one may conclude that radio link 150 between base unit 120 and mobile unit 110 while being in the kitchen is very poor. The time periods corresponding to the subject being in the kitchen may be derived, e.g., based on "typical" kitchen times (e.g. 12:00 to 14:00) or on more specific on bases of knowledge of the caregiver who knows the actual behavior and position of the subject during a typical day. Knowing the kitchen's location is beneficial, but not essential in order to give advice on repositioning the base unit because of excessive power usage during specific repeating time frames or patterns during a given day. In the present example, the advice to be generated should be to move base unit 120 to a more favorite position with respect to the kitchen, while not sacrificing too much on transmission path to the bedroom.

The aforementioned example is a first basic approach on using available data for optimizing base unit 120's position for lowest transmission power usage.

In an embodiment, the user interface unit 142 is provided on second mobile unit 130. Second mobile unit 130 may correspond to the caregiver's cell phone. By means of user interface 142, it is possible to present some kind of feedback on selecting a better position for base unit 120, e.g., within the premises of the person involved. Such functionality needs input data, so blocking this information gathering and observing the consequences on the system response would be a possible approach to verify the operation of the system. To be more specific, any (semi)automatic system relies on input data. In an example, one may thus first make an inventory of the involved information sources. After that, one may, one by one, block each of these information sources and observe the effect on the system. From the observed effects it is possible to extract the functioning of the system. The above approach is straightforward for a possible accelerometer information stream, but might be more difficult for the transmission power and distance information, which, quite frequently, are not directly accessible as hardware interfaces. That is, while there may be an output port for providing transmission power and/or distance information, this will normally be a common port for all information sources. Therefore, blocking only one of the source information will typically involve a change to the internal firmware of the processor to manipulate the data stream, which will be much more difficult to do.

An example application of the invention is in all systems involving a base unit that is wirelessly communicating with a (e.g. battery operated) mobile unit. The invention may be used in a wrist worn device carried by an Alzheimer's disease patient, who is under surveillance of a caregiver.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

The present invention relates to a system, a method and a computer program for adapting power usage of a mobile unit that is configured to communicate data to a base unit. In wearable/portable modules, the power needed by an ISM radio link between the wearable/portable mobile unit and the (quasi-)stationary base unit is determined primarily by the attenuation of the transmitted wave between transmitter and receiver. By monitoring the power setting needed for the transmitter to maintain the link, that information can be used to optimize the position of the base unit for achieving lowest power consumption in the battery operated mobile unit.

The invention claimed is:

1. A system for adapting power usage of a mobile unit that is configured to communicate data to a base unit, the system comprising:
said mobile unit, said base unit, and an analysis unit;
wherein said mobile unit is configured to provide transmission power information to said analysis unit, wherein said transmission power information corresponds to a transmission power needed by said mobile unit as a function of time to maintain a radio link between said mobile unit and said base unit, wherein a relative location of said mobile unit with respect to said base unit varies over time, and wherein said transmission power needed by said mobile unit varies over time depending on said relative location of said mobile unit with respect to said base unit;
wherein said analysis unit is configured to receive spatial information, wherein said spatial information corresponds to the relative location of said mobile unit with respect to said base unit as a function of time;
wherein said analysis unit is configured to provide a recommendation on a location of said base unit, wherein said recommendation is based on said transmission power information and on said spatial information.

2. The system of claim 1,
wherein said spatial information corresponds to a distance between said mobile unit and said base unit or to a weighted distance between said mobile unit and said base unit.

3. The system of claim 1,
wherein said analysis unit is configured to provide said recommendation on the base unit's location by recommending a location corresponding to said relative location during a time period wherein said transmission power needed by said mobile unit or by said base unit is on average high compared to other time periods.

4. The system of claim 1,
wherein said mobile unit further comprises an activity monitoring unit that is configured to provide activity data as a function of time for a subject wearing said mobile unit;
wherein said analysis unit is configured to provide said recommendation on the base unit's location further based on said activity data.

5. The system of claim 1,
wherein said mobile unit further comprises a power supply unit;
wherein said analysis unit is configured to provide said recommendation on the base unit's location further based on a power level of said power supply unit.

6. The system of claim 1,
wherein said analysis unit is configured to provide said recommendation on the base unit's location by evaluating average values for corresponding time periods on different days.

7. The system of claim 1,
wherein said analysis unit comprises at least one of an input unit that is configured to receive said spatial information; or a user interface unit that is configured to receive said spatial information.

8. The system of claim 1,
wherein said system further comprises a second mobile unit separate from said mobile unit, wherein said second mobile unit comprises said analysis unit.

9. The system of claim 1,
wherein said mobile unit comprises an attachment unit that is configured to attach said mobile unit to a subject's wrist.

10. The system of claim 1,
wherein said base unit is quasi-stationary.

11. The system of claim 1,
wherein said analysis unit is configured to provide said recommendation on the base unit's location by recommending a location corresponding to a location of said mobile unit that occurs most frequently during a selected time period.

12. The system of claim 1,
wherein said spatial information received by said analysis unit corresponds to locations within a pre-defined space.

13. An analysis unit that is configured to be employed in a system including a mobile unit, a base unit, and an analysis unit, said analysis unit comprising:
a transmission power information providing unit that is configured to receive transmission power information for said mobile unit, wherein said transmission power information corresponds to a transmission power needed by said mobile unit as a function of time to maintain a radio link between said mobile unit and said base unit, wherein a relative location of said mobile unit with respect to said base unit varies over time, and wherein said transmission power needed by said mobile unit varies over time depending on said relative location of said mobile unit with respect to said base unit; and
a spatial information providing unit that is configured to receive spatial information, wherein said spatial information corresponds to the relative location of said mobile unit with respect to said base unit as a function of time;
wherein said analysis unit is configured to provide a recommendation on a location of said base unit, wherein said recommendation is based on said transmission power information and on said spatial information.

14. A method for adapting power usage of a mobile unit that is configured to communicate data to a base unit, the method comprising the steps of:
receiving transmission power information, wherein said transmission power information corresponds to a transmission power needed by said mobile unit as a function of time to maintain a radio link between said mobile unit and said base unit, wherein a relative location of said mobile unit with respect to said base unit varies over time, and wherein said transmission power needed by said mobile unit varies over time depending on said relative location of said mobile unit with respect to said base unit;
receiving spatial information, wherein said spatial information corresponds to the relative location of said mobile unit with respect to said base unit as a function of time; and
providing a recommendation on a location of said base unit, wherein said recommendation is based on said transmission power information and on said spatial information.

15. A computer program for adapting power usage of a mobile unit that is configured to communicate data to a base unit, the computer program comprising program code means for causing a processor on a computer to execute and control a system for adapting power usage of a mobile unit as defined in claim 1 to carry out the steps of:
- receiving transmission power information, wherein said transmission power information corresponds to a transmission power needed by said mobile unit as a function of time;
- receiving spatial information, wherein said spatial information corresponds to a relative location of said mobile unit with respect to said base unit as a function of time; and
- providing a recommendation on a location of said base unit,
- wherein said recommendation is based on said transmission power information and on said spatial information.

16. The system of claim 1, wherein said base unit is configured to provide the transmission power information to said analysis unit.

17. The system of claim 16, wherein said base unit monitors said transmission power needed by said mobile unit.

18. The system of claim 17, wherein said mobile unit transmits information about a gain setting of a receiver of said mobile unit to said analysis unit.

19. The system of claim 1, wherein said mobile unit is the only mobile unit of said system and said base unit is the only base unit of said system.

20. The system of claim 1, wherein said recommendation corresponds to a time period wherein said transmission power needed by said mobile unit is on average higher compared to a transmission power needed by said mobile unit at other time periods.

* * * * *